United States Patent
Bauerle et al.

(10) Patent No.: US 7,278,952 B2
(45) Date of Patent: Oct. 9, 2007

(54) TERMINATING OR DISALLOWING SIGNALS TO INCREASE A THROTTLE OPENING

(75) Inventors: Paul A. Bauerle, Fenton, MI (US); Mark H. Costin, Bloomfield Township, MI (US); Kerfegar K. Katrak, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 146 days.

(21) Appl. No.: 10/953,783

(22) Filed: Sep. 29, 2004

(65) Prior Publication Data

US 2006/0068974 A1   Mar. 30, 2006

(51) Int. Cl.
  *B60W 10/04* (2006.01)
(52) U.S. Cl. ................................ 477/107; 477/110
(58) Field of Classification Search ................ 477/107, 477/110
  See application file for complete search history.

(56) References Cited

U.S. PATENT DOCUMENTS

| | | | | |
|---|---|---|---|---|
| 4,881,428 A | * | 11/1989 | Ishikawa et al. | 477/110 |
| 5,478,293 A | * | 12/1995 | Yonezawa | 477/110 |
| 5,603,672 A | * | 2/1997 | Zhang | 477/110 |
| 5,820,516 A | * | 10/1998 | Sasaki et al. | 477/109 |
| 5,863,275 A | * | 1/1999 | Nozaki et al. | 477/110 |
| 6,024,669 A | * | 2/2000 | Iwatsuki et al. | 477/107 |
| 6,322,478 B1 | * | 11/2001 | Jackson | 477/109 |
| 6,843,756 B2 | * | 1/2005 | Sato et al. | 477/144 |
| 2004/0224820 A1 | * | 11/2004 | Matsumura et al. | 477/107 |
| 2005/0049111 A1 | * | 3/2005 | Takada et al. | 477/107 |
| 2006/0217230 A1 | * | 9/2006 | Tanaka | 477/110 |

\* cited by examiner

*Primary Examiner*—Sherry Estremsky
*Assistant Examiner*—Justin K. Holmes

(57) ABSTRACT

A throttle control system is presented. A throttle has a throttle actuator coupled to a throttle plate. A control module is coupled to the throttle actuator. The control module sends a first signal within a gear change time period to the throttle actuator to position the throttle plate for an increased throttle opening. The control module terminates the first signal after the gear change time period. The control module sends a second signal to the throttle actuator to position the throttle plate. The control module positions the throttle plate by the throttle actuator to attain a lower throttle opening limit. A downshift from a higher gear to a lower gear occurs.

12 Claims, 6 Drawing Sheets

TERMINATING OR DISALLOWING SIGNALS TO INCREASE A THROTTLE OPENING

TECHNICAL FIELD

The invention relates generally to engine control systems, and more particularly to engine control systems that terminate or disallow signals that increase the throttle opening in a vehicle powertrain.

BACKGROUND OF THE INVENTION

A vehicle powertrain typically includes a transmission, an engine, and a powertrain control module. The transmission transfers engine output torque through a gear reduction to a driveshaft, which rotates the wheels of the vehicle. The powertrain control module controls the operation of the transmission and the engine.

A clutch-to-clutch transmission combines two manual transmission autoshifts (MTAs). One MTA includes gears 1, 3, and 5 and the other MTA includes gears 2, 4, and 6. By combining two MTAs, a driver experiences less torque interruption during upshifts and downshifts.

A coast downshift under power (CDP) occurs when the transmission shifts from a higher gear (e.g., third gear) to a lower gear (e.g., second gear). For a given vehicle speed, a lower gear requires an increased engine speed as compared to a higher gear. In order to meet this increased engine speed requirement, two signals are automatically generated from the powertrain control module. One signal from the powertrain control module increases the throttle opening to deliver a maximum idle speed for the vehicle. This signal may be inadequate to deliver sufficient engine speed. Another signal generated from the powertrain control module commands a gear change. After shifting the gears, clutch-to-clutch torque occurs that increases the engine speed to allow the gears to be downshifted. Generally, the signal to increase the throttle opening remains active even though sufficient engine speed exists to attain a maximum idle speed for the vehicle. There are several disadvantages to this approach. Increasing the throttle opening increases fuel consumption. In addition, the combination of increased clutch-to-clutch torque and the signal to increase the throttle opening may result in slippage of the clutches between the two gears. Clutch slippage increases clutch wear. Moreover, the powertrain control module may need to rely more heavily on spark retard torque management.

SUMMARY OF THE INVENTION

One embodiment of the invention relates to a throttle control system. A throttle includes a throttle actuator coupled to a throttle plate. A control module is coupled to the throttle actuator. The control module sends a first signal within a gear change time period to the throttle actuator to position the throttle plate for an increased throttle opening. The control module terminates the first signal after the gear change time period. The control module sends a second signal to the throttle actuator to position the throttle plate. The control module positions the throttle plate by the throttle actuator to attain a lower throttle opening limit. A downshift from a higher gear to a lower gear occurs.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
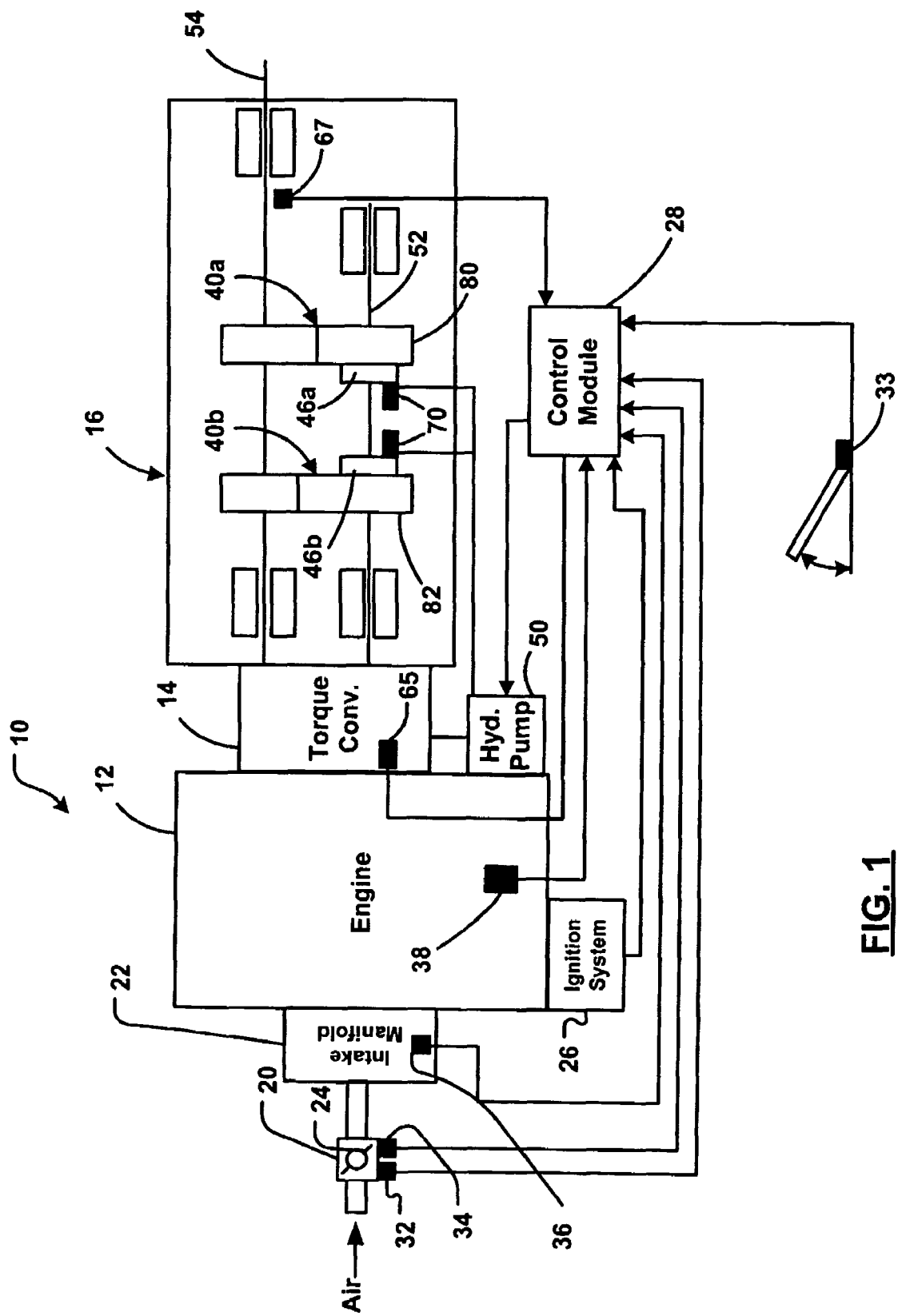
FIG. 1 is a functional block diagram and schematic of a vehicle powertrain in accordance with one embodiment of the invention.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The invention improves fuel efficiency of the vehicle by terminating the signal that increases the throttle opening while downshifting from a higher gear to a lower gear in a clutch-to-clutch transmission. Additionally, downshifting is completed in a shorter period of time. There is also less dependency upon spark retard torque management during gear shifts. Clutch wear is also reduced. Presented below is a general description of a vehicle powertrain followed by a discussion of the techniques according to the present invention.

Referring now to FIG. 1, a vehicle powertrain 10 is schematically illustrated. The vehicle powertrain 10 includes an engine 12, a torque converter 14, and a clutch-to-clutch transmission 16. The engine 12 includes a throttle 20 and an intake manifold 22. Air is drawn into the intake manifold 22 through the throttle 20. The throttle 20 includes a throttle plate 24 that is adjustable to regulate the air flow into the intake manifold 22. The air drawn into the intake manifold 22 is mixed with fuel for combustion within cylinders (not shown) of the engine 12. Combustion of the air fuel mixture is initiated by spark plugs (not shown) that are controlled by an ignition system 26. Spark plug timing can be adjusted by the ignition system 26 relative to the position of the pistons (not shown). Spark advance or retard relative to the piston position varies the torque output of the engine 12.

A control module 28 controls the operation of the engine 12 and transmission 16. While the control module 28 is represented as a single component, the control module 28 may also comprise two or more separate controllers such as a transmission control module and an engine control module. The control module 28 communicates with the ignition system 26 to control spark timing. The control module 28 also communicates with a throttle position sensor (TPS) 32 and a throttle actuator 34. The TPS 32 generates a throttle position signal and the throttle actuator 34 adjusts the position of the throttle plate 24 based on a control signal generated by the control module 28.

The control module 28 also communicates with an intake manifold absolute pressure (MAP) sensor 36 and an engine speed sensor 38. The MAP sensor 36 generates a pressure signal and the engine speed sensor 38 generates a speed signal indicating the engine revolutions per minute (RPM).

The vehicle transmission 16 is coupled to the torque converter 14 and includes a plurality of gear sets 40a, 40b, hydraulically-actuated multiple clutches 46a, 46b, and a hydraulic pump 50. The hydraulic pump 50 may be driven by the engine 12 or an electric motor. The torque converter 14 enables start-off, provides torque multiplication, and absorbs harmonic vibrations within the vehicle powertrain 10.

The gear sets 40a, 40b are located between an input shaft 52, which is connected to the torque converter 14, and an output shaft 54. The gear sets 40a, 40b enable the output shaft 54 to be driven at multiple gear ratios. The multiple clutches 46a, 46b are selectively engaged. The hydraulic pump 50 supplies hydraulic fluid pressure for the valve body and shift components and/or for the torque converter 14.

The control module 28 defines gear selection and shift points and regulates demand-response shifting. Demand-response shifting is based on input from the driver using a position of an accelerator 33, engine operating conditions, and/or vehicle speed. The control module 28 executes a transmission control system, which is a combined hydraulic and electric control system. The transmission control system hydraulically actuates the clutches 46a, 46b. The transmission control system actuates gear selection and modulates the clutch pressure electronically in accordance with the torque flowing through the clutch-to-clutch transmission 16. Load sensors 65 and the speed sensor 67 monitor the torque converter load and the rotational speed of the output shaft 54, respectively. The control module 28 adjusts the analog or digital pressure regulators 70 to control the clutch pressure.

Shift-quality depends upon the accuracy that the pressure of the clutches 46a, 46b is adjusted to the level of torque transmitted. The level of torque transmitted is estimated based on the engine load and the output shaft speed. As the automatic transmission shifts gear ratios, one clutch gradually disengages (i.e. is off-going) as another clutch gradually engages (i.e. is on-coming). The decrease and increase of pressure of the off-going and on-coming clutches, respectively, determines the operator's feel.

In operation, a first gear 80 of the first gear set 40a is initially coupled to the input shaft 52 to drive the output shaft 54 at a first gear ratio. When a downshift is signaled by the control module 28, the clutch 46a gradually increases engagement of the first gear 80 with the input shaft 52 (i.e., is off-going). The second clutch 46b gradually decreases engagement of a second gear 82 of the second gear set 40b with the input shaft 52 (i.e., is oncoming). Eventually, the first clutch 46a completely couples the first gear 80 from the input shaft 52 and the second clutch 46b disengages the second gear 82 with the input shaft 52 to drive the output shaft 54 at a second gear ratio.

Given this description of the vehicle powertrain 10, the discussion now turns to the techniques of the invention that relate to a command, referred to as a first signal, for increasing the throttle opening during coast downshifts under power (CDP). One embodiment involves terminating the first signal after a termination condition occurs. A termination condition is based upon the expiration of a gear change time period, a throttle opening limit (e.g., input from the accelerator pedal 33), and/or an engine operating condition.

The mechanism for terminating a signal is varied. For example, another signal may be sent from the control module 28 to the throttle actuator 34 to terminate the first signal. Alternatively, the first signal remains active until the control module 28 causes the first signal to cease thereby closing a relay (not shown) that is coupled to the throttle actuator 34. A closed relay causes the throttle actuator 34 to decrease the throttle opening through adjustment of the throttle plate 24. Other conventional means for terminating a signal may also be applied.

Figure 2:
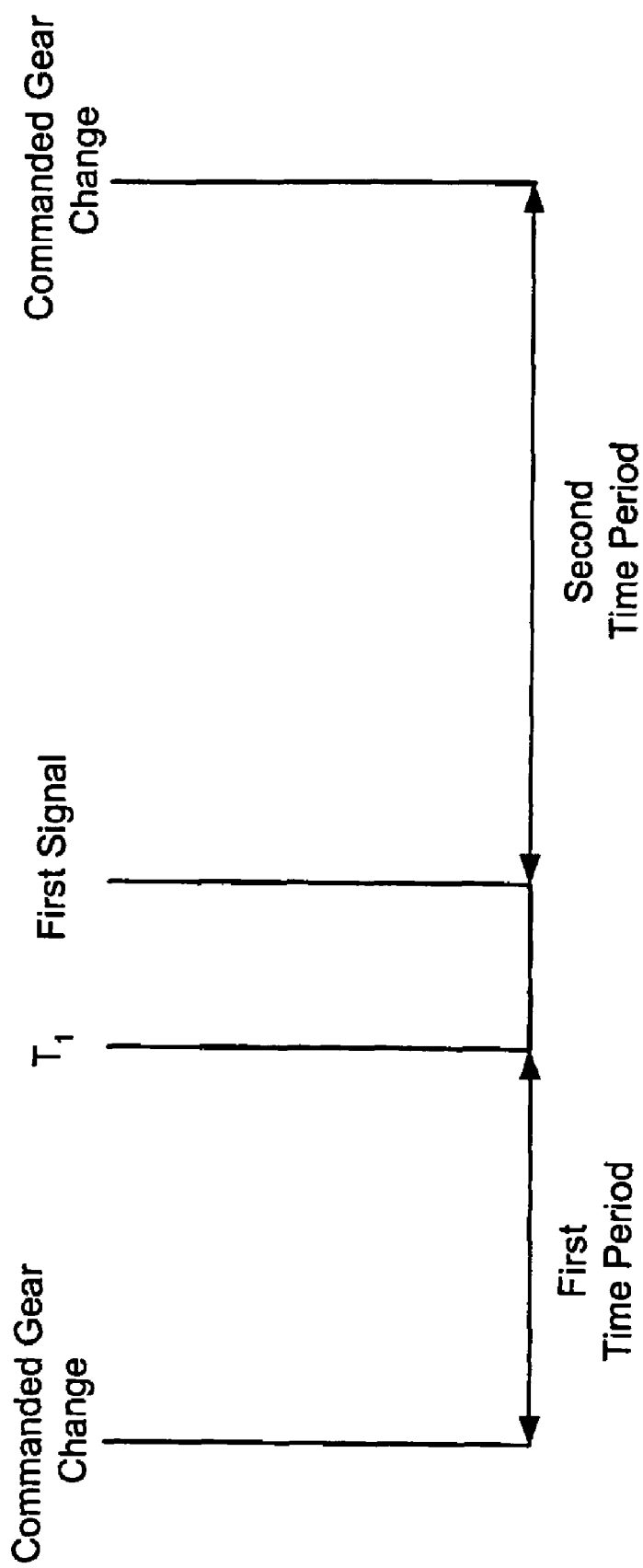
FIG. 2 is a timeline illustrating a combination of time periods that are based on a commanded gear change in accordance with one embodiment of the invention.
Figure 3:
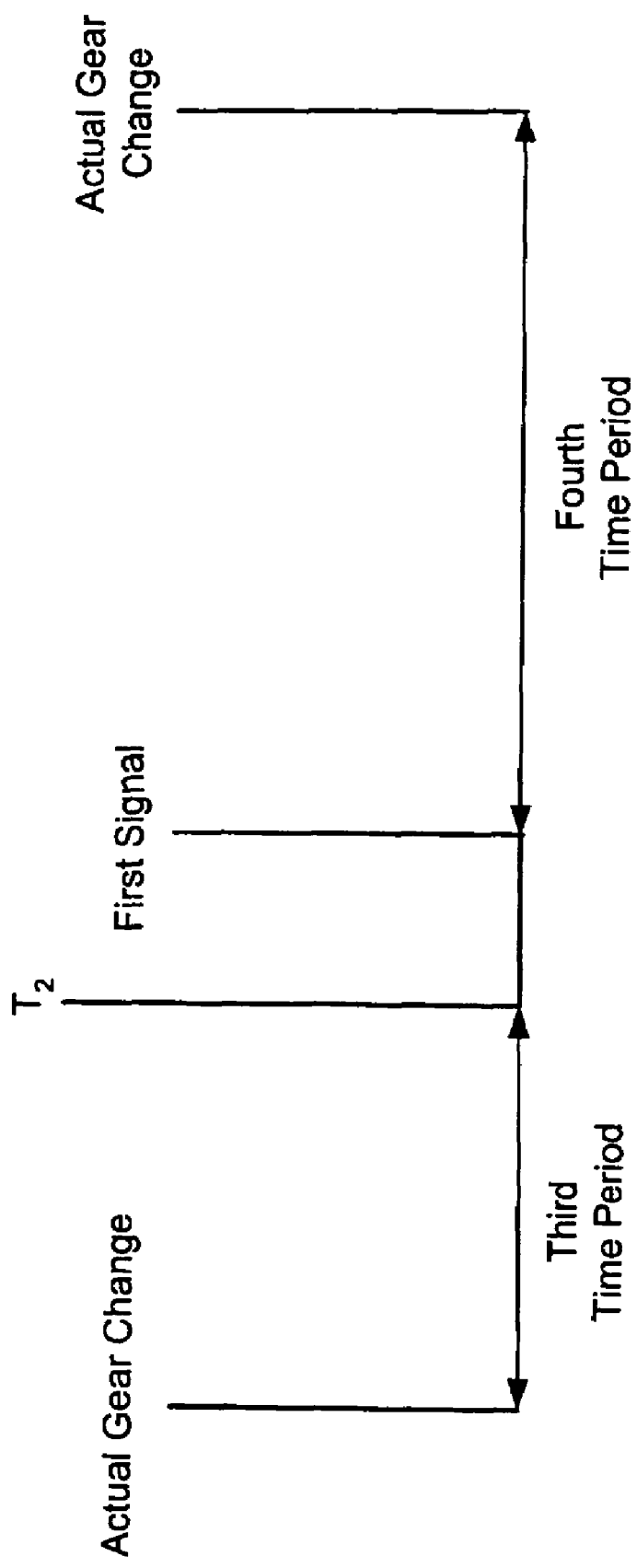
FIG. 3 is a timeline illustrating a combination of time periods that is based on an actual gear change in accordance with the present invention.

FIGS. 2 and 3 illustrate timelines in which the first signal is terminated after a gear change time period. Referring now to FIG. 2, a commanded gear change signal, generated by the control module 28 to the transmission 16, may occur before or after the generation of the first signal. In this embodiment, a gear change time period spans two time periods. One time period, referred to as the first time period, begins with a commanded gear change and extends until time $T_1$. $T_1$ occurs before a first signal is generated. The second time period extends from the first signal until another commanded gear change occurs. After expiration of the second time period (i.e., the end of a gear change time period), the first signal is immediately terminated. The opening of the throttle is adjusted such that the speed of the vehicle is returned to a maximum idle speed or some alternate speed.

Skilled artisans appreciate that another embodiment involves a gear change time period that relates solely to the second time period. The first time period is not present.

FIG. 3 illustrates an actual gear change that may occur before or after the generation of the first signal. In this embodiment, the third time period begins with an actual gear change and extends until time $T_2$. $T_2$ occurs before a first signal is generated. The fourth time period extends from the first signal until another actual gear change occurs. After expiration of the fourth time period (i.e., the end of a gear change time period), the first signal is immediately terminated. The opening of the throttle is adjusted such that the speed of the vehicle is returned to a maximum idle speed or some alternate speed.

Skilled artisans appreciate that another embodiment involves a gear change time period that relates solely to the fourth time period. Specifically, the third time period is not involved in this embodiment.

Figure 4:
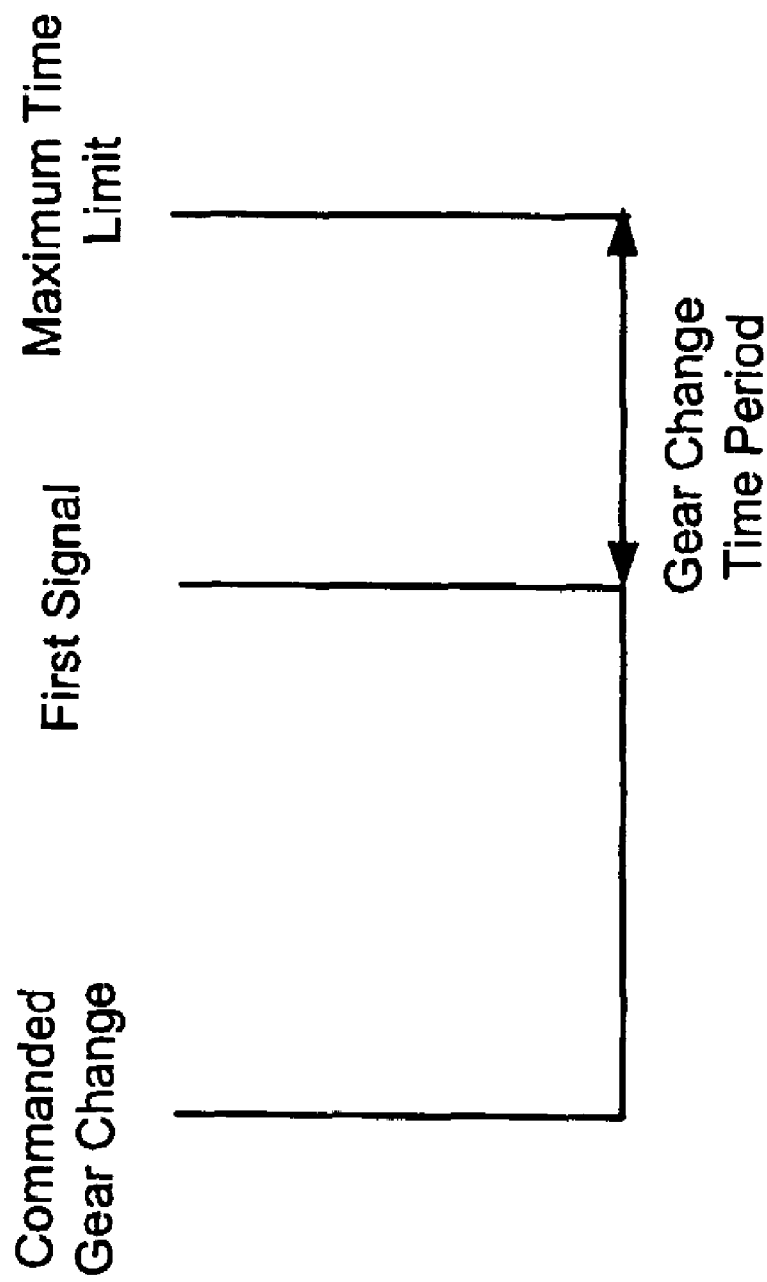
FIG. 4 is a timeline illustrating a signal to increase a throttle opening relative to a maximum time lime limit in accordance with one embodiment of this invention.

FIG. 4 illustrates the first signal being terminated after a gear change time period defined by a first signal and a maximum time limit. The maximum time limit may be based upon a variety of conditions, as described below. In one embodiment, the maximum time depends upon the engine speed. For instance, the engine speed sensor 38 may send an electrical signal to the control module 28 indicating that the speed of engine 12 has substantially increased. The control module 28 then compares the engine speed to the engine speed level needed to complete downshifting of the gears. If sufficient engine speed exists, the control module 28 terminates the first signal after the gear change time period has expired. The opening of the throttle is adjusted such that the speed of the vehicle is returned to a maximum idle speed or some alternate speed.

Alternatively, a scheduled high throttle profile limit is used for example the throttle opening request is above the low throttle profile limit (typically a maximum idle authority limit until the maximum time limit (e.g., 500 milliseconds from the beginning of the high profile limit) is reached. This timer increments when the request is above the low throttle profile limit and freezes when the request is at or below the low throttle profile limit. Thereafter, the low throttle profile limit is implemented.

In another embodiment, the maximum time limit is based on a throttle opening limit. Specifically, the throttle opening limit is based on an engine RPM with a calculated value of the gear ratio and transmission output speed. Once the engine RPM attains a level relative to the gear ratio and transmission output speed that makes the first signal unnecessary to downshift the gears, the maximum time limit is met.

In another embodiment, the maximum time limit may be based upon the average throttle opening request. In order to limit the average transmission throttle request to a maximum idle throttle limit, this can be estimated using an Exponentially Weighted Moving Average (EWMA) or a first order lag filter with time constant on the order of 2-3 seconds. Then if multiple transmission shifts are required, maximum time limit does not generally time out as long as the average does not exceed maximum idle. If the average is less than maximum idle when the throttle increase request goes away, reset the maximum time limit timer to zero, thus generating new 500 ms window. If the average is greater than maximum idle when the throttle request goes away, freeze timer, and if it is at max (500 ms), the maximum time limit is met and the first signal is terminated. Then if the transmission continued to request more throttle opening events above maximum idle, the average would exceed maximum idle and the timer would freeze, restricting future requests to maximum idle.

In yet another embodiment, the maximum time limit may be based upon a function of a certain engine speed to vehicle speed ratio (n/v ratio). Once the n/v ratio attains a level that allows downshifting of the gears, the maximum time limit is met and the first signal is terminated.

In another embodiment, the maximum time limit may be based upon a throttle opening limit as related to the transmission gear ratio. Specifically, a third gear may correspond to a particular throttle opening limit. Accordingly, once this throttle opening limit is attained, the maximum time limit is reached.

In another embodiment, the throttle increase level may be selected for each gear's n/v ratio. In this embodiment, the higher throttle limit is selected when two conditions occur. The first condition is an input from an accelerator pedal 33 (e.g., a lightly loaded pedal such as less than 8%), which is less than a threshold level for an n/v ratio. The second condition is attaining a time limit. The time limit may be established based upon the amount of time needed for downshifting (e.g., fourth to first gear). Once both of these conditions are met, the first signal is terminated.

In still yet another embodiment, a throttle opening limit is continuously determined based on tabulated throttle opening limits relative to the difference between the safe levels of the transmission commanded gear turbine revolutions per minute (RPM) and the engine RPM. Skilled artisans appreciate that the throttle opening limit cannot exceed a predetermined speed difference such as a 3000 RPM difference between the transmission commanded gear turbine RPM and the engine RPM. Additionally, a throttle opening limit cannot exceed a 35% throttle area opening. Exceeding these requirements can damage components in the vehicle powertrain 10.

After terminating the first signal as shown in FIGS. 2-4, a second signal is sent from the control module 28 to the throttle actuator 34. The second signal positions the throttle plate 25 to attain a lower throttle opening limit. The throttle actuator 34 adjusts the throttle plate 24 to a position to match the engine speed. In another embodiment, the throttle opening limit either returns the speed of the vehicle to an idle speed, a maximum idle speed, or some other suitable vehicle speed.

Figure 5:
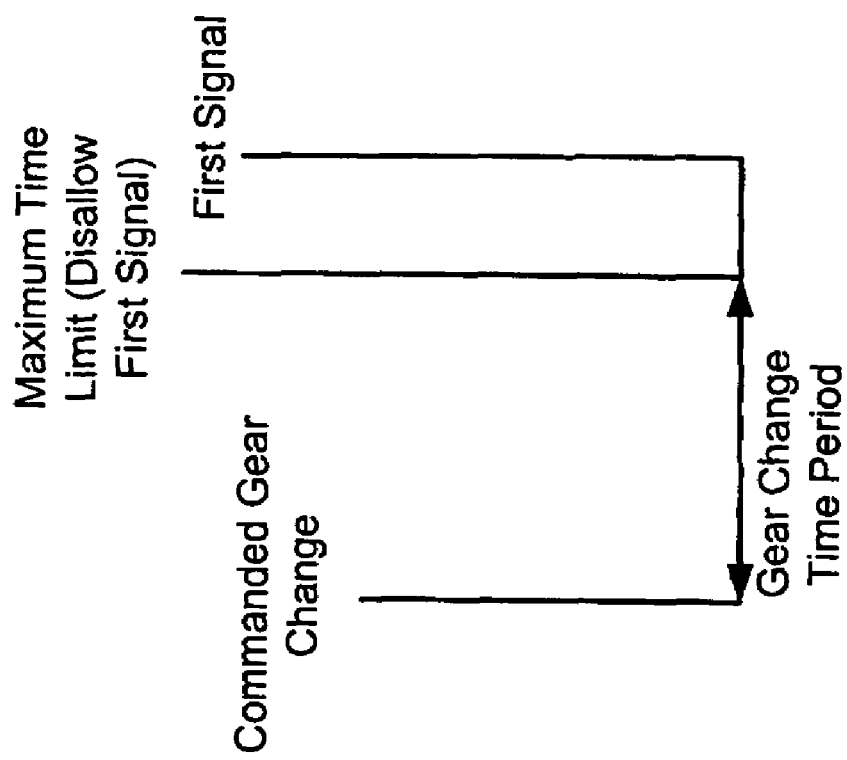
FIG. 5 is a timeline illustrating a maximum time lime limit that is used to disallow or prevent a signal to increase a throttle opening in accordance with one embodiment of this invention.

FIG. 5 illustrates the disallowance of the first signal following a gear change. In this embodiment, the commanded gear change occurs followed by a maximum time limit. This maximum time limit may be based upon a variety of factors. For example, the maximum time limit may be based on the average time in which the first signal is typically generated from the control module 28 after the generation of the commanded gear change. In another embodiment the maximum time limit may be based upon the recent history or average of the throttle opening requests. In another embodiment, the maximum time limit may be based, in part, on the control module 28 determining that the first signal is not needed to increase the engine speed for a downshift in gears to occur. This is accomplished by using conventional methods for predicting the actual engine speed once the downshifting process has begun. In this embodiment, the control module 28 does not allow or prevents the first signal from being generated.

Figure 6:
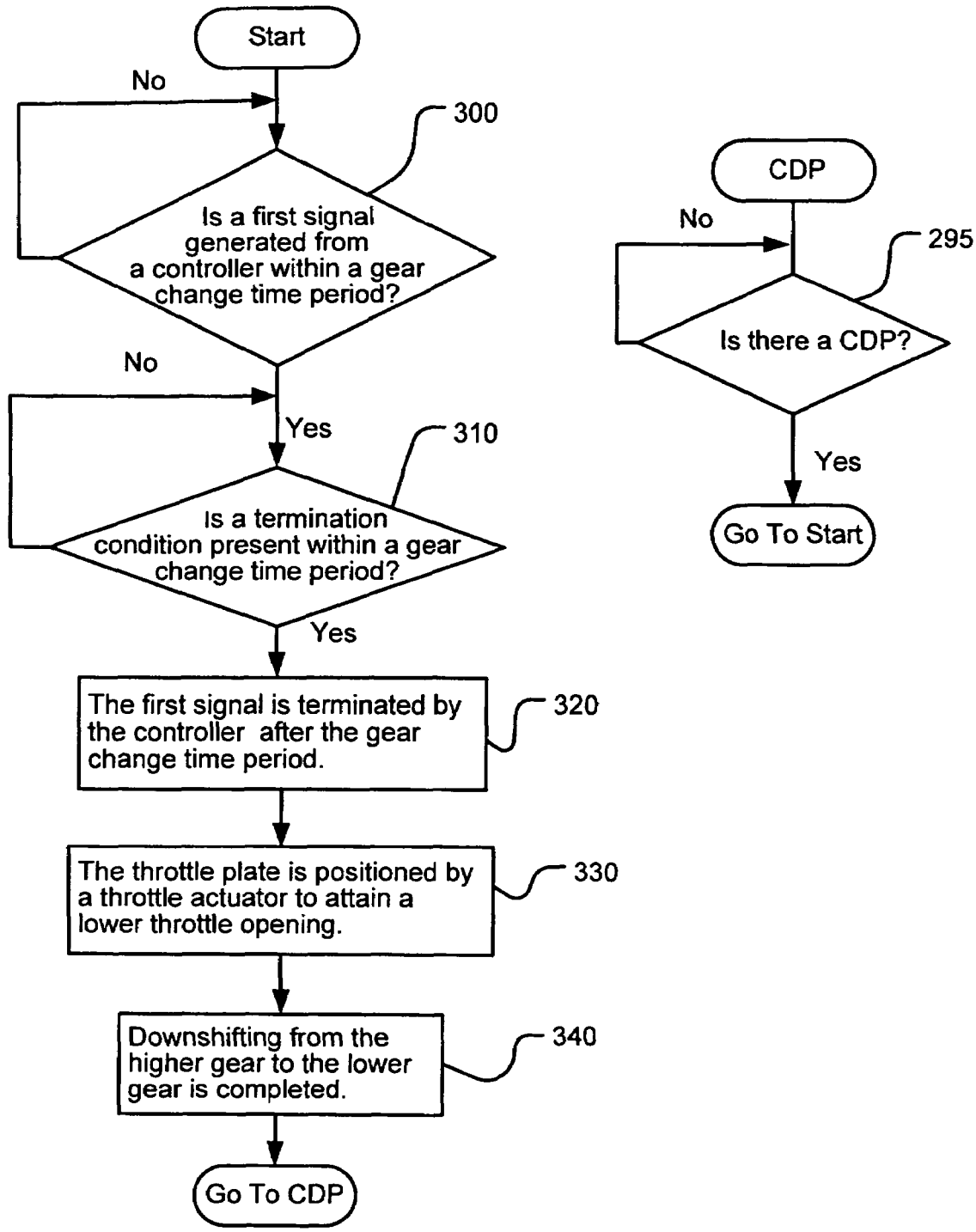
FIG. 6 is a flow chart of one method of terminating signals to increase a throttle opening in accordance with one embodiment of the invention.

FIG. 6 is a flow diagram of a method of adjusting the throttle opening in accordance with one embodiment of the present invention. At operation 295, it is determined whether a CDP is occurring. At operation 300, a determination is made as to whether a first signal is generated from a control module within a gear change time period to increase the throttle opening. At operation 310, a determination is made as to whether a termination condition has been met. The termination condition may be a maximum time, a throttle opening limit, an input from the pedal 33, or an engine operating condition. The maximum time limit may be based upon a variety of factors such as those described above. Alternatively, a throttle opening limit may determine whether to terminate the first signal. For example, once the throttle opening limit reaches a specified level for a certain gear, the throttle opening limit is automatically adjusted to a lower throttle opening. Alternatively, the throttle opening limit may attain a specified level for a gear versus the difference between the transmission commanded gear revolutions per minute (RPM) and the engine RPM. Once this condition is met, the first signal is terminated.

In another embodiment, an engine operating condition may be used to terminate the first signal. For example, the engine RPM may attain a certain level with a calculated value of a gear ratio and the transmission output speed. In yet another embodiment, the engine to vehicle speed ratio determines whether the first signal is disallowed.

At operation 320, the first signal is terminated by the control module after the gear change time period. At operation 330, the throttle plate is positioned by a throttle actuator to attain a lower throttle opening. At operation 340, downshifting from a higher gear to a lower gear is completed.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

The invention claimed is:

1. A throttle control system comprising:
   a throttle having a throttle actuator coupled to a throttle plate; and
   a control module that is coupled to the throttle actuator that sends a first signal within a gear change time period to the throttle actuator to position the throttle plate for an increased throttle opening, that terminates the first signal after the gear change time period, that sends a second signal to the throttle actuator to position the throttle plate, that positions the throttle plate by the throttle actuator to attain a lower throttle opening limit, and that downshifts from a higher gear to a lower gear, wherein the gear change time period extends to one of a commanded gear change, a maximum time limit, and an actual gear change and wherein the control module determines a throttle opening limit based upon a difference between a transmission commanded gear turbine revolutions per minute (RPM) and an engine RPM.

2. A method for regulating a throttle in a clutch-to-clutch transmission of a vehicle during a coast downshift under power, comprising:
   sending a first signal within a gear change time period from a control module to the clutch-to-clutch transmission;
   attaining a maximum time;
   terminating the first signal after the gear change time period; and
   shifting a throttle opening limit from a first throttle opening limit to a second throttle opening limit at the maximum time wherein the maximum time is reached when an average throttle opening request exceeds a low throttle opening limit.

3. The method of claim 2 wherein the first throttle opening limit is a high throttle opening limit and the second throttle opening limit is a low throttle opening limit.

4. A method for regulating a throttle in a clutch-to-clutch transmission of a vehicle during a coast downshift under power, comprising:
   sending a first signal within a gear change time period from a control module to a throttle actuator to increase a throttle opening;
   determining a first throttle opening limit based upon a difference between a transmission commanded gear turbine RPM and an engine RPM;
   attaining the first throttle opening limit;
   transitioning from the first throttle opening limit based upon an engine to vehicle speed ratio;
   terminating the first signal within a gear change time period; and
   decreasing the throttle opening to a second throttle opening limit.

5. The method of claim 4 further comprising transitioning from the first throttle opening limit based upon a high throttle opening profile and a low throttle opening profile.

6. The method of claim 4 further comprising:
   selecting the second throttle opening limit such that a speed of a vehicle consists essentially of an idle speed, a maximum idle speed, a speed greater than the maximum idle speed.

7. A method for controlling a throttle of a vehicle, comprising:
   sending a first signal within a gear change time period from a control module to a throttle actuator to position a throttle plate for an increased throttle opening, wherein the gear change time period extends to one of a commanded gear change, a maximum time limit, an actual gear change and the first signal being generated;
   terminating the first signal by the control module after the gear change time period;
   sending a second signal from the control module to the throttle actuator to position the throttle plate;
   determining the throttle opening limit based upon a difference between a transmission commanded gear turbine revolutions per minute (RPM) and an engine RPM;
   positioning the throttle plate by the throttle actuator to attain a lower throttle opening limit; and
   downshifting from a higher gear to a lower gear.

8. The method of claim 7 wherein the gear change time period extends from the first signal until a maximum time limit.

9. The method of claim 7 further comprising:
   sensing an increased speed in an engine during the gear change period to an adequate level for downshifting from a higher gear to a lower gear.

10. The method of claim 7 further comprising:
    allowing the throttle opening to increase for a maximum time period determined by one of a timer and a selection of a time period from a look-up table; and
    decreasing the throttle opening after the maximum time period.

11. The method of claim 7 further comprising:
    scheduling a throttle opening limit to comprise a profile having a first profile limit and a second profile limit.

12. The method of claim 11 wherein the first profile limit is a high profile limit and the second profile limit is a low profile limit.

* * * * *